Figure 3:
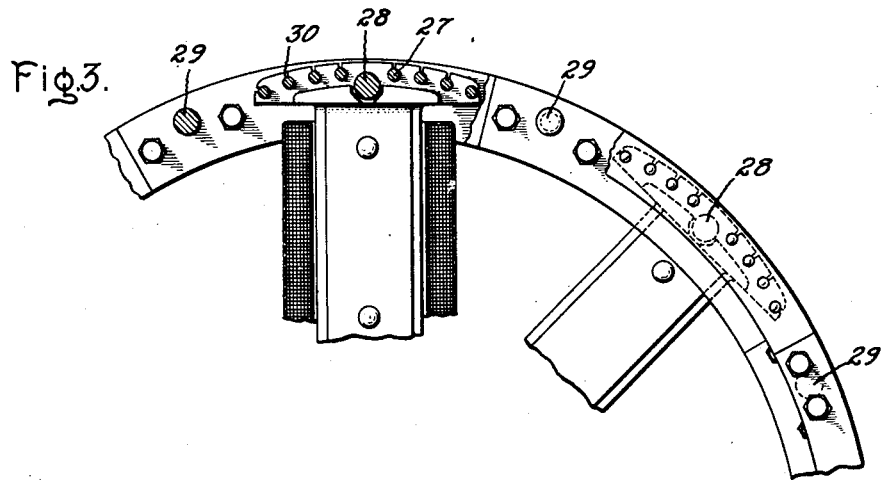

May 27, 1924.
E. F. W. ALEXANDERSON
1,495,969
DOUBLE SQUIRREL CAGE SYNCHRONOUS MOTOR
Filed March 23, 1920    2 Sheets-Sheet 1
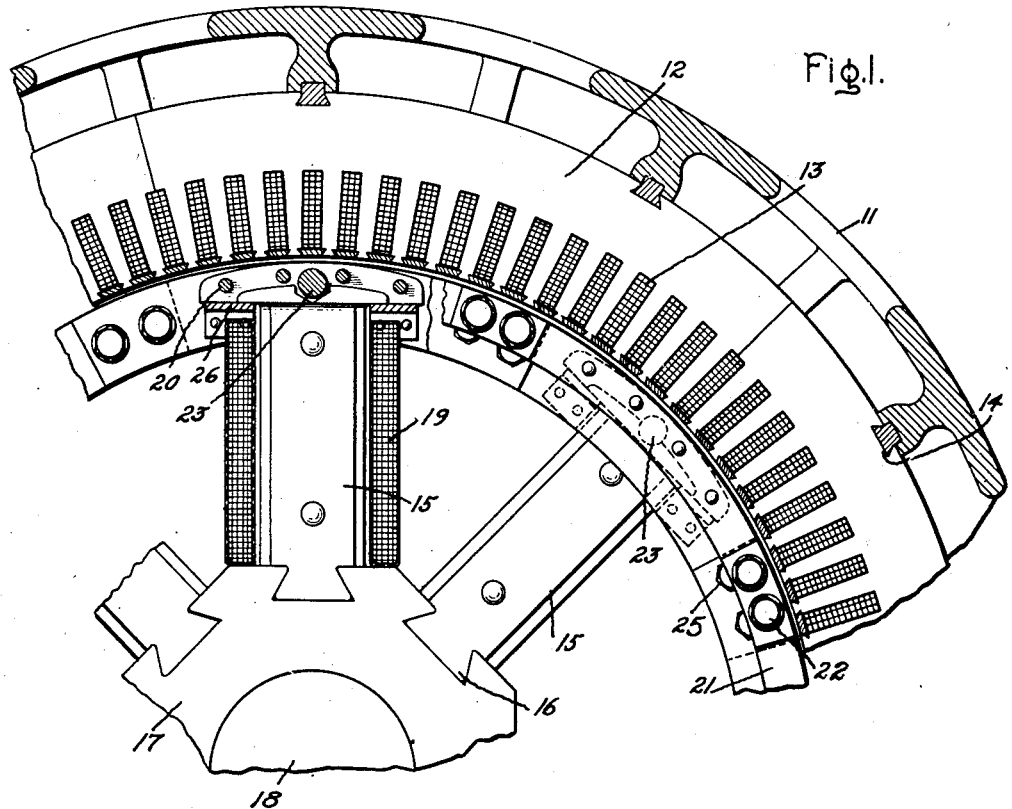
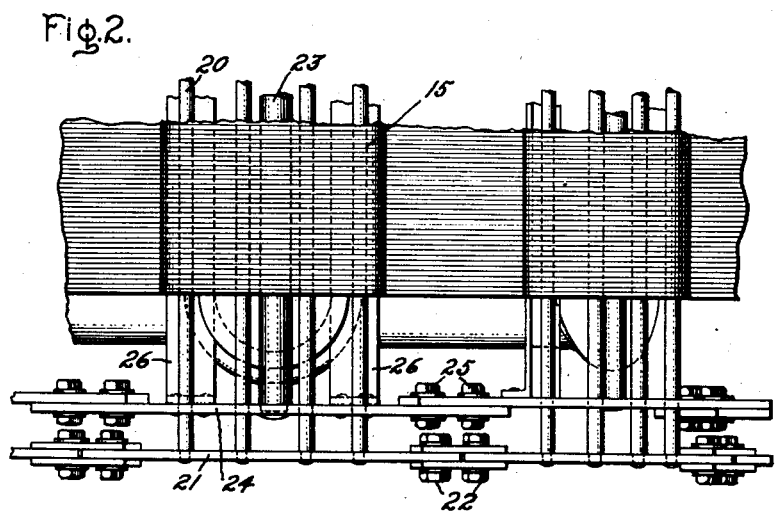
Inventor:
Ernst F. W. Alexanderson,
by Albert G. Davis
His Attorney.

May 27, 1924.

E. F. W. ALEXANDERSON 1,495,969

DOUBLE SQUIRREL CAGE SYNCHRONOUS MOTOR

Filed March 23, 1920   2 Sheets-Sheet 2

Inventor:
Ernst F. W. Alexanderson,
by
His Attorney.

Patented May 27, 1924.

1,495,969

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DOUBLE-SQUIRREL-CAGE SYNCHRONOUS MOTOR.

Application filed March 23, 1920. Serial No. 368,195.

*To all whom it may concern:*

Be it known that I, ERNST F. W. ALEXANDERSON, a citizen of the United States, residing at Schenectady, county of Schenectady, State of New York, have invented certain new and useful Improvements in Double-Squirrel-Cage Synchronous Motors, of which the following is a specification.

My invention relates to synchronous motors, and particularly to self starting synchronous motors.

This application is a continuation in part of an application, entitled Electric ship propulsion, filed in my name, Serial No. 358,973, dated Feb. 16, 1920, and assigned to the same assignee as this application.

Synchronous motors that are self starting have been known for a comparatively long time. The best known and most simple way of starting such machines is by the use of short circuited windings on the revolving field member, whereby the said revolving member acts as the rotor of an induction motor. Such short circuited windings are also useful for the purpose of preventing hunting as well as for starting the machine. A double squirrel cage for the induction motor stage of operation of a synchronous motor has the advantage that the speed torque curve has a flatter shape between standstill and synchronism, and gives a low initial or starting kilovolt-amperes. These advantages being apparent in the starting stage in the operation of synchronous motors, in general no problem presents itself to construct a double squirrel cage synchronous motor other than is already present for the construction of a double squirrel cage induction motor. The double squirrel cage, in order to be effective, is so constructed that it has a fairly high torque at low speeds as well as a fairly high torque at speeds near synchronism. It is this latter result which is made use of for synchronous motor operation. The point at which the exciting windings are connected to a source of direct current and at which the machine is pulled into synchronism must be fairly close to synchronous speed; if not, objectionable disturbances may be produced in the system. Of course, whether the synchronous motor is built with a single or a double squirrel cage, the torque due to the squirrel cage always drops to zero at synchronism, as is well known, so that all that a double squirrel cage may accomplish in a synchronous motor is to prevent a large rush of current at starting and to give a fairly high torque near synchronism. A single squirrel cage construction may be designed to fulfill either of these two functions, but not both; a duplication of the squirrel cage winding thus becomes necessary.

However, there are several special problems met with when a double squirrel cage is to be constructed for synchronous motors. This results from the use of definite poles on the rotating element of the synchronous machine. These polar projections must carry exciting windings and it is highly desirable, when the squirrel cage windings are placed upon the rotating element, that such squirrel cage windings should not reduce the effective winding space of the exciting windings on the polar projections. In an induction motor this problem does not present itself, since no direct current exciting windings are needed. It is highly desirable, therefore that both of these squirrel cage windings be as near to the periphery of the polar elements as possible. This condition, however, conflicts with the requirement that one of the squirrel cage windings be so located as to have a comparatively high self induction and low resistance. It is the object of my invention to locate the squirrel cage windings in such a way that they do not interfere with the exciting winding and at the same time fulfill the requirements as to their relative resistance and self-induction. I accomplish this result by concentrating the low resistance squirrel cage windings into a relatively small number of bars. I find that even though these bars are imbedded but a short distance below the surface, the self-induction is high because there are only a small number of bars per pole. Various arrangements of the bars for the two squirrel cages will be readily apparent to those skilled in the art. So long as the low resistance winding is concentrated in a comparatively small number of bars, the requirement as to high self induction is met.

Figure 4:
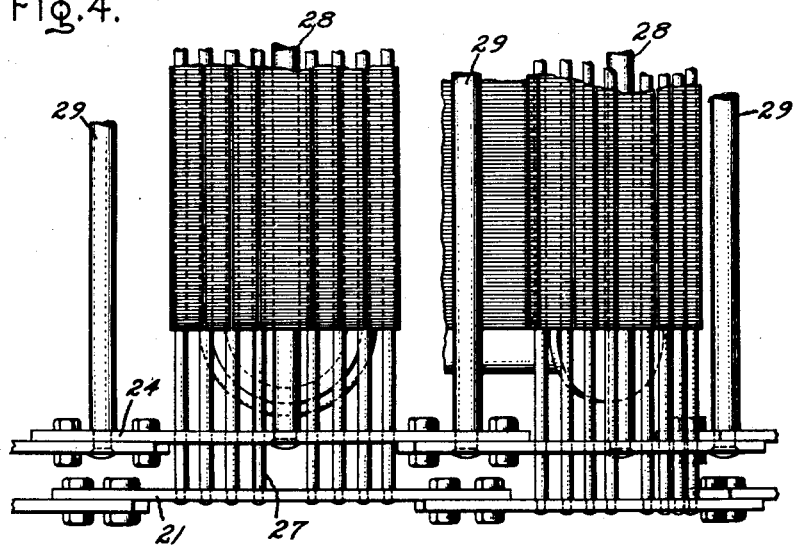

The construction and mode of operation of my invention will be understood from the description and the accompanying drawings in which Fig. 1 is a view showing the construction of a rotary element of a synchronous machine, built according to my invention, and the stator cooperating therewith; Fig. 2 is a plan view of the rotary element shown in Fig. 1; Fig. 3 is a modification showing a slightly different arrangement of the bars for the two squirrel cage windings, and Fig. 4 is a plan view of the modification shown in Fig. 3.

Referring now more in detail to the drawing in which like reference characters refer to like parts throughout, the stationary element 11 comprises the stationary armature of a synchronous machine. The magnetic structure is made up of a series of laminations 12, having slots 13 for the accommodation of the windings therein. Appropriate means are also provided, such as the dovetail slot and key 14 for holding the laminations in place in the stationary frame 11.

The rotary element comprises a plurality of polar projections 15 preferably built up of laminations as distinctly shown in Fig. 2. Appropriate means are shown, such as the dovetail joints 16 for holding the polar projections to the spider 17 rigidly fastened to the rotating shaft 18. Exciting coils 19 which are adapted to be connected to a source of direct current, magnetize the polar projections 15 when the machine is operating as a synchronous motor. A squirrel cage winding of high resistance is shown, comprising a plurality of relatively small bars 20 extending entirely through the polar projections and appropriately fastened such as by riveting to the end rings 21. Only a portion of one of the end rings is shown in the figures. The bars 20 are arranged two on each side of the center line of the polar projection. The end ring 21 in this case is shown as built up of similarly shaped segments appropriately fastened together by fastening devices, such as bolts 22. The high resistance squirrel cage winding bars 20 are located as near the outer surfaces of the polar projections as is practicable. In this way the self induction of this winding is reduced to a minimum.

The low resistance squirrel cage winding consists of a relatively small number of heavy bars 23. In the particular arrangement illustrated in the drawing, each of the polar projections carries one such bar at the center thereof, as clearly shown in Fig. 1. These bars are made of low resistance material and are imbedded only slightly deeper than the high resistance bars 20, and, in fact, as near the periphery as bars 20 permit. The low resistance bars 23 are riveted to the end rings 24 which are likewise shown as made up of segments and as appropriately fastened together by bolts 25. It is evident that although two sets of end rings are shown, both windings may be connected to the same set. In addition to the round bars 23 passing through the poles I utilize a pair of rectangular bars 26 for each polar projection, located just beneath the pole tips. These bars are bent down at their ends as clearly shown in Fig. 2 and are appropriately fastened to the end rings 24, as shown in Fig. 2.

As described, it is evident that the low resistance squirrel cage winding does not encroach on the winding space required for the coils 19, while due to the fact that these bars are comparatively few, the requisite of relatively high self induction is also secured. The rectangular bars 26 serve to reduce the resistance of the entire squirrel cage as well as to make this winding effective as a damper winding and to reduce the time constant of the exciting coils 19. While the form shown in Figs. 1 and 2 may be preferable for a large variety of work, I find that the modification illustrated in Figs. 3 and 4 fulfills the functions as well as the first modification described.

In these two figures the high resistance squirrel cage winding is now made up with eight bars per pole instead of with four as in the other modification. Each of these bars 27 is placed in slots near the outer surface in the polar projection, the saw cuts 30 being provided for disturbing the continuity of the magnetic flux path around each bar. In this way the self induction of the high resistance winding is further reduced. The high resistance bars 27 are arranged in two groups, four on each side of the central line of the polar projection, so that there may be left sufficient space at this point for the accommodation of the low resistance squirrel cage bars 28. In this modification, instead of having rectangular bars under the pole tips, there are bars 29 located between the polar projections of approximately the same cross-section as the bars 28. The end rings 21 and 24 may be constructed as the end rings of the modification shown in Figs. 1 and 2 and there is no need for describing this structure in any greater detail.

The operating characteristics of a motor such as I have described are thought to be self evident since they differ in no way from the operating characters of a double squirrel cage induction motor up to the point of synchronous operation. While the machine is being rotated synchronously, the two squirrel cage windings are useful for dampening purposes.

While I have shown in accompanying drawings the preferred embodiments of my invention, I do not wish to be limited thereto but aim to cover in the appended claims all modifications falling fairly within the scope of my invention.

What I claim as new and desire to secure by Letters Patent of the United States, is,—

1. A rotating element for a synchronous motor, polar projections, an exciting winding for said projections and a double squirrel cage winding for said rotating element, one of said squirrel cage windings comprising a plurality of small bars imbedded near the periphery of said projections and the other of said squirrel cage windings comprising a relatively smaller number of bars of larger cross section a portion of which are imbedded in the center of said projections closely adjacent the high resistance winding and other bars of said second mentioned winding located between said polar projections.

2. A dynamo electric machine of the synchronous type wherein the rotating element comprises a plurality of polar projections provided with exciting windings and wherein a double squirrel cage winding is applied to the rotating element, characterized by the fact that one of said squirrel cage windings comprises a plurality of relatively high resistance conductors imbedded near the periphery of said polar projections and by the fact that the other squirrel cage winding consists of a relatively smaller number of low resistance conductors symmetrically distributed, certain of said bars being imbedded substantially at the center of the periphery of said poler projections and the others of said conductors being located between said polar projections whereby said low resistance bars are comparatively widely separated and whereby ample winding space is provided for said exciting windings.

3. In a rotating element for a synchronous motor, polar projections, an exciting winding for said projections, a high resistance squirrel cage winding comprising a plurality of small bars imbedded near the periphery of said projections, end rings for said winding, a low resistance squirrel cage winding including one bar of relatively large cross section imbedded in each polar projection near the high resistance winding, end rings for said low resistance winding, and other bars of large cross section connecting said end rings, located outside of said polar projections.

4. In a rotating element for a synchronous motor, polar projections, an exciting winding for said projections, a high resistance squirrel cage winding comprising a plurality of small bars imbedded near the periphery of said projections, and rings for said winding, a large bar imbedded in the center of each polar projection slightly beneath the high resistance winding, end rings for said large bars, and large bars located between said polar projections also connecting said end rings, said arrangement of large bars thus constituting a high self-induction winding without interference with the exciting winding space.

5. In a rotating element for synchronous motors, polar projections, an exciting winding for said projections, a high resistance squirrel cage winding comprising a plurality of small bars located near the outer surface of said polar projections, and a low resistance squirrel cage winding comprising one large bar in the center of each polar projection and near the periphery of said projections, and large bars located between the polar projections.

In witness whereof, I have hereunto set my hand this 22nd day of March, 1920.

ERNST F. W. ALEXANDERSON.